(12) United States Patent
Miyazaki

(10) Patent No.: US 9,281,127 B2
(45) Date of Patent: Mar. 8, 2016

(54) ELECTRONIC COMPONENT AND METHOD FOR MANUFACTURING THE SAME

(71) Applicant: Murata Manufacturing Co., Ltd., Nagaokakyo-shi, Kyoto-fu (JP)

(72) Inventor: Toshiki Miyazaki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 111 days.

(21) Appl. No.: 14/198,612

(22) Filed: Mar. 6, 2014

(65) Prior Publication Data

US 2014/0254064 A1 Sep. 11, 2014

(30) Foreign Application Priority Data

Mar. 7, 2013 (JP) ................................. 2013-044909
Jan. 10, 2014 (JP) ................................. 2014-002869

(51) Int. Cl.
*H01G 4/228* (2006.01)
*H01G 4/30* (2006.01)
*H01G 4/232* (2006.01)

(52) U.S. Cl.
CPC ............... *H01G 4/30* (2013.01); *H01G 4/2325* (2013.01)

(58) Field of Classification Search
USPC ................ 361/306.3, 301.2–301.4, 303–305, 361/306.1, 311–313, 321.1, 321.2
See application file for complete search history.

(56) References Cited

U.S. PATENT DOCUMENTS

| | | | |
|---|---|---|---|
| 5,508,562 A * | 4/1996 | Horie et al. | 257/772 |
| 2012/0120547 A1 | 5/2012 | Ro et al. | |
| 2012/0194031 A1 | 8/2012 | Ogawa et al. | |
| 2012/0236462 A1* | 9/2012 | Haruki et al. | 361/306.1 |
| 2012/0319536 A1* | 12/2012 | Sakuratani | 310/366 |
| 2013/0050896 A1* | 2/2013 | Park et al. | 361/321.1 |

FOREIGN PATENT DOCUMENTS

| | | |
|---|---|---|
| JP | 2006-351727 A | 12/2006 |
| JP | 2012-69827 A | 4/2012 |
| KR | 10-2012-0052818 A | 5/2012 |
| KR | 10-2012-0089199 A | 8/2012 |

OTHER PUBLICATIONS

Official Communication issued in corresponding Korean Patent Application No. 10-2014-0025136, mailed on Feb. 23, 2015.

* cited by examiner

*Primary Examiner* — Nguyen T Ha
(74) *Attorney, Agent, or Firm* — Keating & Bennett, LLP

(57) ABSTRACT

In a method for manufacturing an electronic component, when conductive paste used to form outer electrodes is applied to a component body, a side surface of the component body is subjected to an affinity-reducing process to reduce an affinity for solvent, and then an end surface of the component body is dipped into the conductive paste. Accordingly, spreading of the conductive paste stops at ridge portions of the component body, and the conductive paste is applied to a large thickness. After that, the end surface of the component body is dipped deeper into the conductive paste. Also in this step, the affinity-reducing process prevents upward spreading of the conductive paste along the side surface.

20 Claims, 10 Drawing Sheets

ELECTRONIC COMPONENT AND METHOD FOR MANUFACTURING THE SAME

BACKGROUND OF THE INVENTION

1. Field of the Invention

The present invention relates to electronic components and methods for manufacturing the electronic components, and more particularly, to an electronic component including outer electrodes made of conductive paste and a method for manufacturing the electronic component.

2. Description of the Related Art

Japanese Unexamined Patent Application Publication No. 2006-351727, for example, describes an interesting technology related to the present invention. Japanese Unexamined Patent Application Publication No. 2006-351727 describes a method for manufacturing a high-reliability electronic component in which outer electrodes have a sufficient thickness at corner portions and ridge portions of end surfaces of an electronic component element, and in which the outer electrodes have a uniform and appropriate thickness in central regions of the end surfaces.

In this method, conductive paste is applied to an end surface of the electronic component element in a first conductive-paste-applying step. After that, the end surface of the electronic component element to which the conductive paste is applied is pressed against a flat surface having no conductive paste applied thereto, and is then moved away from the flat surface, so that the conductive paste applied to portions other than the corner portions and the ridge portions of the end surface is removed. Next, the end surface of the electronic component element is dipped into the conductive paste in a second conductive-paste-applying step, so that the conductive paste is applied to the end surface over the entire area thereof. After that, the end surface of the electronic component element to which the conductive paste is applied is pressed against an excess-conductive-paste-removing surface, which has projections and recesses, and is then moved away from the excess-conductive-paste-removing surface, so that an excess portion, including a bulging portion, of the conductive paste applied to the end surface is removed.

Japanese Unexamined Patent Application Publication No. 2006-351727 describes that, according to the above-described method for manufacturing an electronic component, outer electrodes can be formed so as to have a sufficient thickness at ridge portions, and a high-reliability electronic component can be manufactured.

A problem to be solved by preferred embodiments of the present invention will be described with reference to a monolithic ceramic capacitor, which is an example of an electronic component.

To satisfy an increasing demand for large-capacitance monolithic ceramic capacitors, it is necessary to increase the volume capacitance rate. Various measures for increasing the volume capacitance rate have been studied. An example of such a measure is to reduce the volume of outer electrodes to increase the volume capacitance rate.

To increase the volume capacitance rate by reducing the volume of the outer electrodes, it is necessary to reduce the thickness of the outer electrodes. However, when the thickness of the outer electrodes, which are made of conductive paste, is reduced, even if the thickness of the outer electrodes is sufficient on the end surfaces of a component body, the thickness may be insufficient on the ridge portions of the component body. This may lead to a reduction in moisture resistance of the electronic component. For example, when the outer electrodes are subjected to wet plating, plating solution may intrude into the spaces between the component body and the outer electrodes and the inner space of the component body through portions of the outer electrodes on the ridge portions of the component body. The intrusion of the plating solution may cause a solder explosion in a process of mounting the monolithic ceramic capacitor with solder.

In addition, to reduce the thickness of the outer electrodes made of conductive paste, it is necessary to use a conductive paste having a low viscosity. However, when an end surface of the component body is dipped into the conductive paste having a low viscosity, the conductive paste easily spreads upward along side surfaces of the component body. FIG. 13 shows an electronic component 1 in which outer electrodes 3 and 4 are formed on both end portions of a component body 2. When the conductive paste used to form the outer electrodes 3 and 4 has a low viscosity, the conductive paste easily spreads upward along side surfaces 5 of the component body 2. Therefore, as illustrated in FIG. 13, the outer electrodes 3 and 4 tend to be formed such that central portions of edges 6 and 7 thereof on the side surfaces 5 are curved so as to bulge by a relatively large amount.

The fact that the outer electrodes 3 and 4 have the curved edges 6 and 7, respectively, as described above does not cause a serious problem. However, when attention is focused on the amounts by which the curved edges 6 and 7 of the outer electrodes 3 and 4 bulge, as the amounts of bulge increase, the difference between the amount of bulge of the edge 6 of one outer electrode 3 and that of the edge 7 of the other outer electrode 4 increases. In FIG. 13, the amounts of bulge of the curved edges 6 and 7 of the outer electrodes 3 and 4, respectively, drawn by solid lines are substantially the same. However, the amount of bulge of the edge 7 of the outer electrode 4 drawn by the broken line is greater than that of the curved edge 6 of the outer electrode 3 drawn by the solid line.

As in the case of the edge 7 of the outer electrode 4 drawn by the broken line in FIG. 13, when the amount of bulge of the edge 7 of the outer electrode 4 differs from that of the edge 6 of the outer electrode 3 that opposes the edge 7 of the outer electrode 4, solder adheres to the outer electrodes 3 and 4 in different manners in the process of mounting the electronic component 1. As a result, a phenomenon called tombstoning may occur.

SUMMARY OF THE INVENTION

Accordingly, preferred embodiments of the present invention provide an electronic component and a method for manufacturing an electronic component with which, even when thin outer electrodes are formed by using conductive paste, the outer electrodes have a sufficient thickness at ridge portions of a component body and the difference between the amount of bulge of the edge of one outer electrode and that of the edge of the other outer electrode is significantly reduced.

According to a preferred embodiment of the present invention, a method for manufacturing an electronic component includes a step of preparing a component body including first and second end surfaces that oppose each other and a side surface that connects the first and second end surfaces; a step of preparing conductive paste containing metal powder, a resin, and a solvent; a step of applying the conductive paste at least to each of the first and second end surfaces of the component body; and a step of performing a heat treatment on the conductive paste to form first and second outer electrodes at least on the first and second end surfaces, respectively, of the component body.

The step of applying the conductive paste includes a first affinity-reducing step of performing an affinity-reducing process at least on the side surface of the component body, the affinity-reducing process being performed to reduce an affinity for the solvent, a first dipping step of dipping each of the first and second end surfaces of the component body into the conductive paste, the first dipping step being performed after the first affinity-reducing step, and a second dipping step of dipping each of the first and second end surfaces of the component body into the conductive paste, the second dipping step being performed after the first dipping step.

When the first dipping step is performed after at least the side surface of the component body is subjected to the affinity-reducing process as above-described, spreading of the conductive paste is significantly reduced or prevented. As a result, the conductive paste is accumulated on the ridge portions at which the end surfaces and the side surface of the component body intersect. Therefore, a thick layer of conductive paste is formed on the ridge portions. As a result of the affinity-reducing process, upward spreading of the conductive paste along the side surface is significantly reduced or prevented in either of the first and second dipping steps.

Preferably, the conductive paste applied in the first dipping step is located at least on ridge portions at which the first and second end surfaces and the side surface of the component body intersect, and has a maximum thickness at portions located on the ridge portions. This structure contributes to increasing the moisture resistance of the electronic component.

Various preferred embodiments of the present invention can be advantageously applied to an electronic component including a component body which includes a plurality of ceramic layers that are stacked and a plurality of inner electrodes that are extend along a plurality of interfaces between the ceramic layers and that are to be electrically connected to the outer electrodes. This is because the inner electrodes to be electrically connected to the outer electrodes are exposed at the end surfaces of the component body, and moisture easily intrudes into the inner space of the component body along the interfaces between the ceramic layers and the inner electrodes in a region of the component body where the inner electrodes are exposed.

In particular, in the case where the ridge portions, at which the first and second end surfaces and side surface of the component body intersect, are chamfered and at least one of the inner electrodes extends to the corresponding chamfered ridge portions of the component body, the problem of intrusion of moisture along the interfaces between the inner electrodes that extend to the ridge portions and the ceramic layers becomes more serious. In this case, the intrusion of moisture is effectively reduced or prevented when the conductive paste applied in the first dipping step has a maximum thickness at portions located on the ridge portions as described above.

The second dipping step is preferably performed so that the conductive paste is applied over a region that extends beyond an edge of the conductive paste applied in the first dipping step and that covers a portion of the side surface of the component body.

Preferably, the step of applying the conductive paste further includes a second affinity-reducing step of performing the affinity-reducing process at least on the side surface of the component body again after the first dipping step and before the second dipping step. In this case, undesirable upward spreading of the conductive paste is reliably prevented also in the second dipping step. In particular, when a drying step and/or a heat treatment step is performed between the first dipping step and the second dipping step as described below, the effect of the affinity-reducing process performed in the first affinity-reducing step is eliminated or reduced by the time the second dipping step is performed. Therefore, it is effective to perform the second affinity-reducing step.

In the second dipping step, the conductive paste may instead be applied so that an edge of the conductive paste is located on a portion of the conductive paste that is applied in the first dipping step and located on the side surface of the component body.

In this case, preferably, the step of applying the conductive paste further includes a second affinity-reducing step of performing the affinity-reducing process again on the portion of the conductive paste applied in the first dipping step, the portion being located on the side surface of the component body, after the first dipping step and before the second dipping step. In this case, undesirable upward spreading of the conductive paste is reliably prevented or significantly reduced also in the second dipping step.

In the step of applying the conductive paste, excess portions of the conductive paste applied to the first and second end surfaces of the component body are preferably removed after the first dipping step. In this case, the outer electrodes are prevented from being excessively thick on the end surfaces of the component body, and the volume of the outer electrodes included in the electronic component are reduced. This contributes to reducing the size of the electronic component.

The step of performing the heat treatment on the conductive paste preferably includes a first heat treatment treatment step that is performed between the first drying step and the second dipping step and a second heat treatment step that is performed after the second drying step.

In each of the first and second affinity-reducing steps, a material having a low affinity for the solvent is applied to at least the side surface of the component body by plasma processing, for example. When plasma processing is performed, it is easy to apply the material having a low affinity for the solvent uniformly to the side surface.

Preferably, the step of applying the conductive paste further includes a first drying step of drying the conductive paste applied in the first dipping step after the first dipping step and a second drying step of drying the conductive paste applied in the second dipping step after the second dipping step.

An electronic component according to another preferred embodiment of the present invention includes a component body including first and second end surfaces that oppose each other and a side surface that connects the first and second end surfaces, and first and second outer electrodes located at least on the first and second end surfaces, respectively, of the component body. The first and second outer electrodes include portions located on ridge portions at which the first and second end surfaces and the side surface of the component body intersect, and fluorocarbon exists at least in intermediate regions in a thickness direction of the portions of the first and second outer electrodes located on the ridge portions. The fluorocarbon is originally contained in the material having a low affinity for the solvent.

According to various preferred embodiments of the present invention, at least the side surface of the component body is subjected to the affinity-reducing process. Therefore, upward spreading of the conductive paste along the side surface is significantly reduced or prevented in the first and second dipping steps.

Therefore, the difference between the amount of bulge of the edge of one outer electrode and that of the edge of the other outer electrode is significantly reduced, and tombstoning is prevented in the process of mounting the electronic component with solder.

In addition, since the conductive paste applied in the first dipping step is accumulated on the ridge portions at which the end surfaces and the side surface of the component body intersect, a thick layer of conductive paste is formed on the ridge portions. As a result, moisture resistance of the electrode component is significantly increased.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A monolithic ceramic capacitor will now be described as an example of an electronic component to which preferred embodiments of the present invention are applied.

Figure 1:
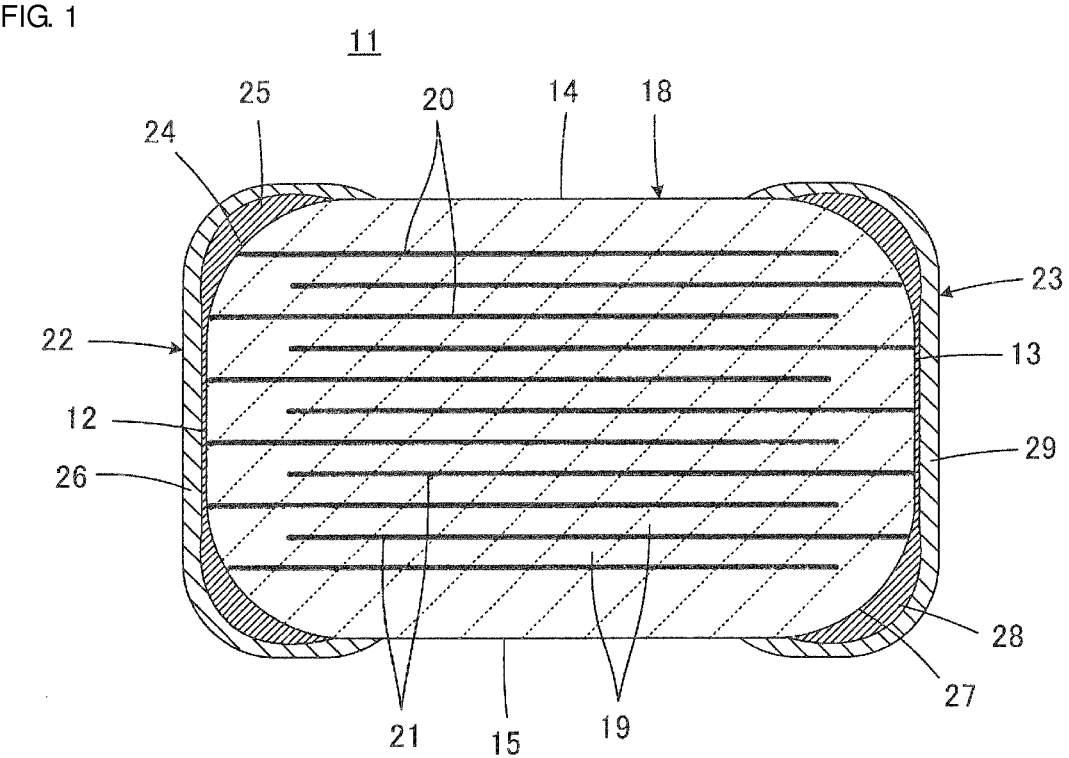
FIG. 1 is a sectional view illustrating a monolithic ceramic capacitor as an example of an electronic component manufactured by a manufacturing method according to a preferred embodiment of the present invention.

Referring to FIG. 1, a monolithic ceramic capacitor 11 includes a rectangular or substantially rectangular parallelepiped component body 18 including first and second end surfaces 12 and 13 that oppose each other and four side surfaces 14 to 17 that connect the first and second end surfaces 12 and 13 (the side surfaces 16 and 17 are parallel to FIG. 1, and are not illustrated in FIG. 1). The component body 18 includes a plurality of ceramic layers 19 that are stacked. The component body 18 also includes a plurality of first inner electrodes 20 and a plurality of second inner electrodes 21, which extend along a plurality of interfaces between the ceramic layers 19. The first and second inner electrodes 20 and 21 are alternately arranged in the stacking direction.

First and second outer electrodes 22 and 23 are respectively formed on the first and second end surfaces 12 and of the component body 18. The first inner electrodes 20 extend to the first end surface 12, and are electrically connected to the first outer electrode 22. The second inner electrodes 21 extend to the second end surface 13, and are electrically connected to the second outer electrode 23. Thus, the electrostatic capacitance provided between the first and second inner electrodes 20 and 21 is taken out through the first and second outer electrodes 22 and 23.

The first outer electrode 22 includes a corner portion 25, which is located on ridge portions 24 at which the first end surface 12 intersects the side surfaces 14 to 17, and a main portion 26, which covers the first end surface 12, the corner portion 25, and portions of the side surfaces 14 to 17. Similarly, the second outer electrode 23 includes a corner portion 28, which is located on ridge portions 27 at which the second end surface 13 intersects the side surfaces 14 to 17, and a main portion 29, which covers the second end surface 13, the corner portion 28, and portions of the side surfaces 14 to 17. In the outer electrodes 22 and 23, the corner portions 25 and 28 are distinguished from the main portions 26 and 29, respectively, for convenience of description of a manufacturing method, which will be described below, since they are formed in different steps in the manufacturing method. In the monolithic ceramic capacitor as a product, the corner portions 25 and 28 are integrated with and are not necessarily distinguished from the main portions 26 and 29, respectively.

A non-limiting example of a method for manufacturing the monolithic ceramic capacitor 11 illustrated in FIG. 1 will now be described.

Figure 2:
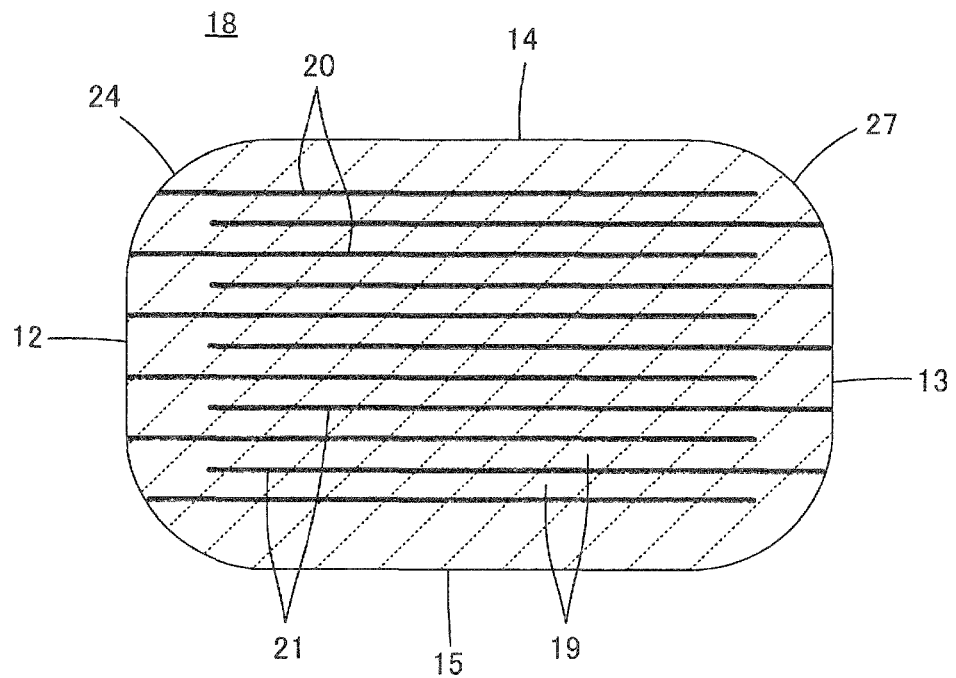
FIG. 2 is a sectional view of a component body included in the monolithic ceramic capacitor illustrated in FIG. 1.

First, the component body 18 illustrated in FIG. 2 is prepared. The component body 18 is preferably subjected to, for example, barrel processing so that the ridge portions 24 and 27, at which the first and second end surfaces 12 and 13 intersect the side surfaces 14 to 17, are chamfered. In this preferred embodiment, some of the first and second inner electrodes 20 and 21 extend to the chamfered ridge portions 24 and 27. Although not illustrated, ridge portions at which the adjacent side surfaces 14 to 17 intersect are also chamfered.

Conductive paste used to form the outer electrodes 22 and 23 is also prepared. The conductive paste contains metal powder, a resin, and a solvent. Preferably, the conductive paste further contains a glass component, and the outer electrodes 22 and 23 are formed by baking the conductive paste in a heat treatment step, which will be described below. The conductive paste may contain a thermosetting resin instead of the glass component, and the outer electrodes 22 and 23 may be formed by a heat treatment step in which the resin is thermally cured.

Next, a step of applying the conductive paste at least to each of the first and second end surfaces 12 and 13 of the component body 18 is performed. In this preferred embodiment, when the conductive-paste-applying step is started, an affinity-reducing step is performed. In the affinity-reducing step, at least the side surfaces 14 to 17 of the component body 18 are subjected to an affinity-reducing process to reduce an affinity for the solvent contained in the conductive paste.

In the affinity-reducing step, a material having a low affinity for the solvent is applied to at least the side surfaces to 17 of the component body 18. In this step, plasma processing is preferably performed. More specifically, a material in the form of a gas, the material having a low affinity for the solvent, is injected into a vacuum chamber while a high-frequency voltage is applied to the gas, so that electrons are caused to collide with the molecules of the gas. Accordingly, gas-derived monomers are generated. These monomers, that is, monomers of the material having a low affinity for the solvent, are caused to adhere to at least the side surfaces 14 to 17 of the component body 18.

Fluorocarbon ($C_xF_y$), for example, may be advantageously used as the above-described material in the form of a gas that has a low affinity for the solvent. In particular, $C_xF_y$ gas that satisfies $y/x \leq 2.5$ is preferably used. When fluorocarbon is used, monomers having CF and $CF_2$ as main components are generated.

In plasma processing, the plasma voltage power, gas flow rate, and processing time may be set to, for example, about 100 V to about 200 V, about 100 cc/min to about 250 cc/min, and about 1 min to about 3 min, respectively.

When plasma processing is performed in the affinity-reducing process, the affinity of the predetermined surfaces of the component body 18 may be uniformly reduced. However, if such an advantage is not particularly required, the affinity-reducing process may be performed by, for example, dipping the component body 18 into liquid containing fluorine instead of performing the plasma processing.

It is not necessary to eliminate the affinity of the side surfaces 14 to 17 of the component body 18 for the solvent in the affinity-reducing process. Although it is sufficient if at least the side surfaces 14 to 17 of the component body 18 are subjected to the affinity-reducing process, the end surfaces 12 and 13 may also be subjected to the affinity-reducing process.

Next, the conductive paste is applied at least to each of the first and second end surfaces 12 and 13 of the component body 18. A conductive-paste-applying device 31 illustrated in FIG. 3, for example, is used to apply the conductive paste.

Figure 3:
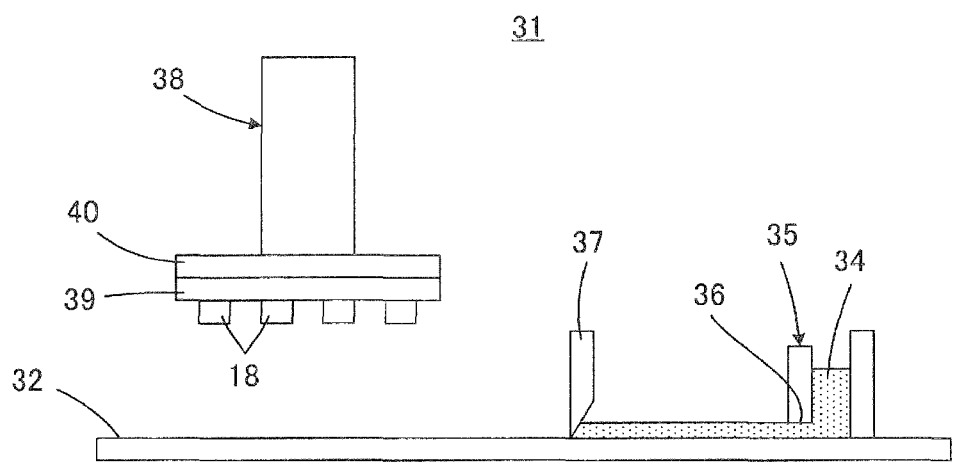
FIG. 3 is a front view of a conductive-paste-applying device used to form outer electrodes on the component body illustrated in FIG. 2.

Referring to FIG. 3, the conductive-paste-applying device 31 includes a stage 32 that extends horizontally. The top surface of the stage 32 is flat. A paste reservoir 35, in which conductive paste 34 is stored, is provided at one end of the stage 32. A paste supply port 36 through which the conductive paste 34 is supplied to the stage 32 is provided at the bottom end of a wall portion that defines the paste reservoir 35.

A blade 37 is arranged so as to be movable in a planar direction of the stage 32. The distance between the blade 37 and the stage 32 is adjustable. The blade 37 is moved in the planar direction of the stage 32, thus leveling the conductive paste 34 and forming a layer of the conductive paste 34 having a predetermined thickness on the stage 32. The thickness of the layer of the conductive paste 34 can be adjusted by adjusting the distance between the blade 37 and the stage 32. The conductive paste 34 may also be removed from the stage 32 by operating the blade 37 while causing the blade 37 to be in contact with the stage 32.

A component body holder 38 that holds a plurality of component bodies 18 is arranged above the stage 32. The component body holder 38 is movable at least toward and away from the stage 32, that is, at least in the vertical direction. The component body holder 38 includes a base 40 and an adhesive elastic member 39 attached to the base 40. Each component body 18 is held such that the end surface 12 or 13 faces the bottom surface of the elastic member 39, which is adhesive. A sheet having an adhesive applied thereto may be used instead of the adhesive elastic member 39. Alternatively, instead of holding the component bodies 18 by using the adhesive force as described above, the component bodies 18 may be held by other devices, for example, by being clamped.

The conductive-paste-applying step, which is performed by using the above-described conductive-paste-applying device 31, will now be described with reference to FIGS. 4A to 8. In FIGS. 4A to 4C, 5A to 5C, and 7A to 7C, the component body holder 38 is not illustrated, but a single component body 18 held by the component body holder 38 is illustrated along with a portion of the stage 32 that corresponds to the component body 18. Although FIGS. 4A to 7C are sectional views, the inner electrodes 20 and 21, which are included in the component body 18, are not illustrated.

Figure 4A:
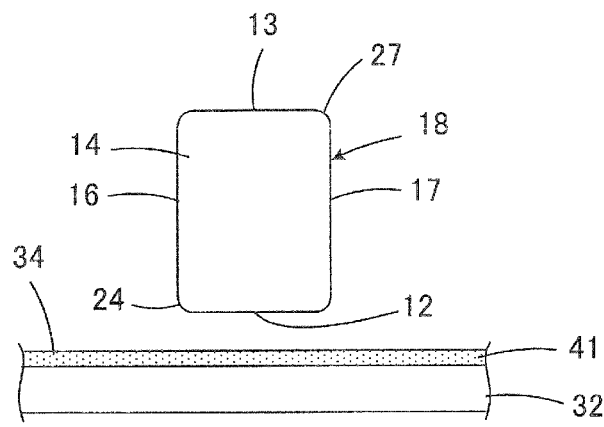
FIGS. 4A to 4C are sectional views illustrating the way in which a first dipping step is performed by the conductive-paste-applying device illustrated in FIG. 3 according to a first preferred embodiment of the present invention.

First, as illustrated in FIG. 4A, the blade 37 is operated so as to form a conductive paste layer 41 made of the conductive paste 34 on the stage 32. When, for example, the dimensions of the component body 18 in the length direction, the width direction, and the thickness direction preferably are about 1.0 mm, about 0.5 mm, about and 0.5 mm, respectively, the conductive paste layer 41 is formed so as to have a relatively small thickness, such as about 10 μm to about 30 μm, for example.

Figure 4B:
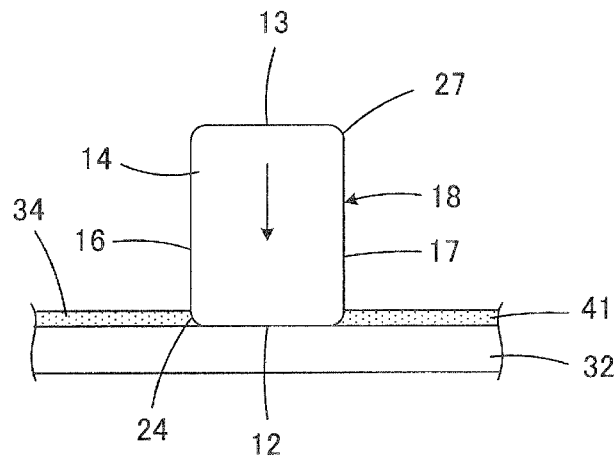

Next, as illustrated in FIG. 4B, the component body holder 38 is moved so that the component body 18 is moved downward in the direction shown by the arrow, and the first end surface 12 of the component body 18 is dipped into the conductive paste layer 41. At this time, at least the ridge portions 24 of the component body 18 are covered by the conductive paste layer 41.

Figure 4C:
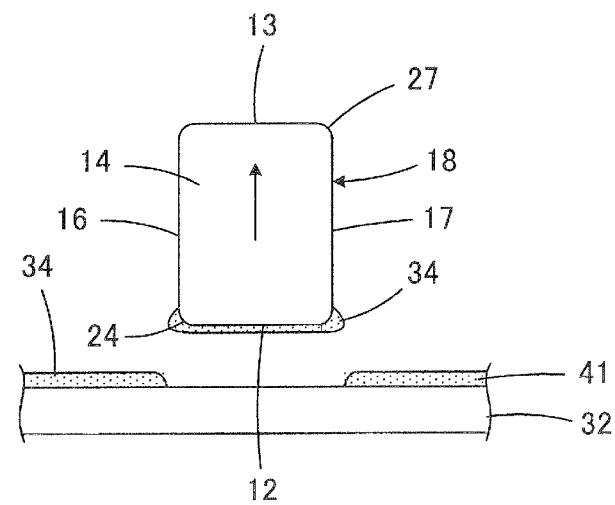

Next, as illustrated in FIG. 4C, the component body holder 38 is moved so that the component body 18 is moved upward in the direction shown by the arrow and pulled away from the conductive paste layer 41. At this time, a predetermined amount of conductive paste 34 is applied to the first end surface 12 of the component body 18.

Figure 5A:
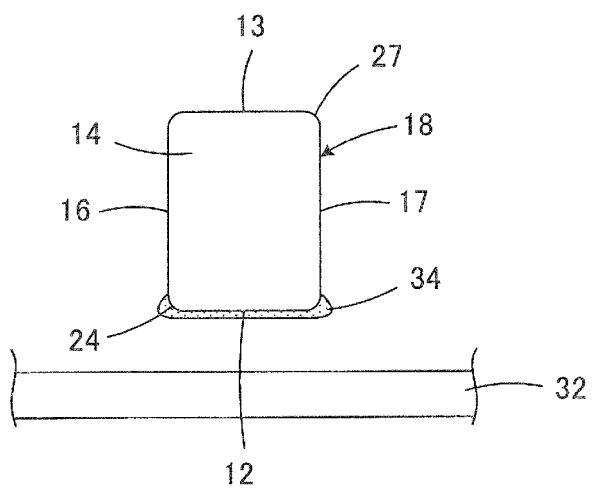
FIGS. 5A to 5C are sectional views illustrating the way in which an excess portion of conductive paste applied by the conductive-paste-applying device 31 in the first dipping step is removed.

Next, as illustrated in FIG. 5A, the blade 37 (see FIG. 3) is operated so as to remove the conductive paste from the stage 32.

Figure 5B:
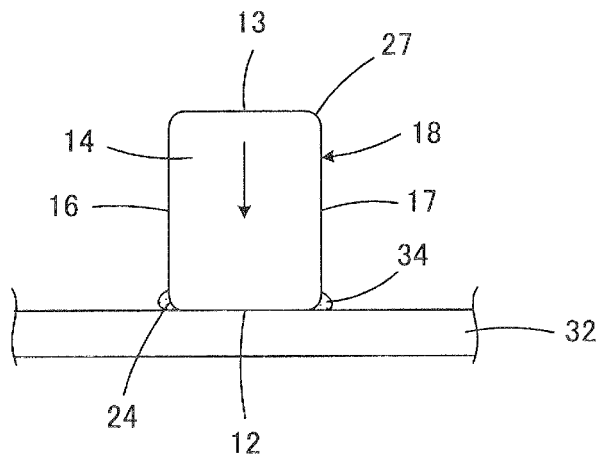

Next, as illustrated in FIG. 5B, the component body holder 38 is moved so that the component body 18 is moved downward in the direction shown by the arrow, and the first end surface 12 of the component body 18 is pressed against the stage 32.

Figure 5C:
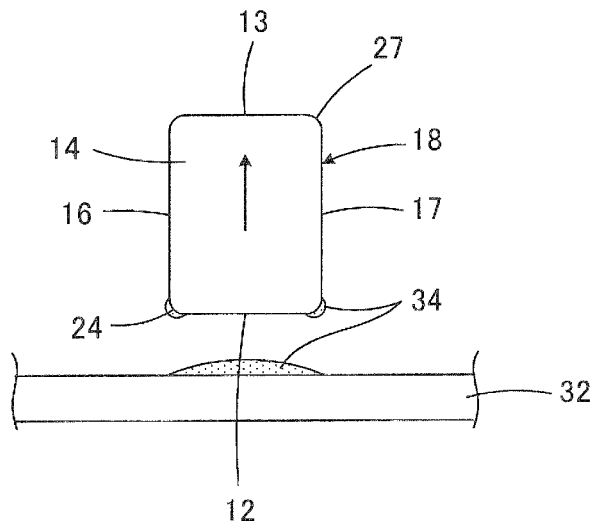

Next, as illustrated in FIG. 5C, the component body holder 38 is moved so that the component body 18 is moved upward in the direction shown by the arrow. As a result, an excess portion of the conductive paste 34 applied to the first end surface 12 is removed by being left on the stage 32. It is not necessary that the conductive paste 34 on the first end surface 12 of the component body 18 be entirely removed, and a thin layer of conductive paste 34 may be left on the first end surface 12. FIG. 1 shows the state in which a thin layer of conductive paste 34 is left on the first end surface 12.

The steps illustrated in FIGS. 5A to 5C may be performed by using the stage 32 having a flat surface, as described above. However, alternatively, these steps may be performed by preparing a plate having a surface with small projections and recesses, pressing the first end surface 12 against this plate, and then moving the first end surface 12 away from the plate.

Figure 6:
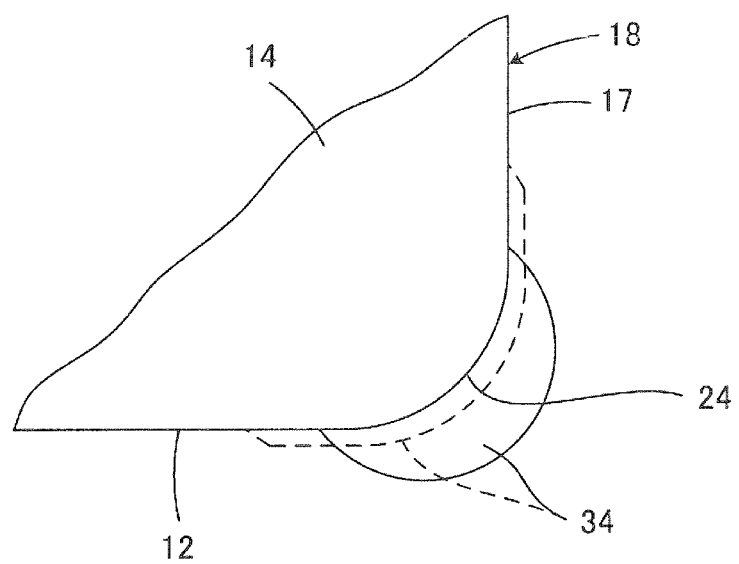
FIG. 6 is an enlarged sectional view of a ridge portion of the component body, illustrating the state of the conductive paste after the step illustrated in FIG. 5C.

FIG. 6 is an enlarged view in which the state of the conductive paste 34 on one of the ridge portions 24 of the component body 18 after the step illustrated in FIG. 5C is shown by a solid line. As shown by the solid line in FIG. 6, the conductive paste 34 is located at least on the ridge portion 24, and has a maximum thickness on the ridge portion 24, which is chamfered. This is because at least the side surfaces 14 to 17 of the component body 18 are subjected to the affinity-reducing process, and spreading of the conductive paste 34 is significantly reduced or prevented, as described above. In the case where only the side surfaces 14 to 17 are subjected to the affinity-reducing process, the conductive paste 34 may spread over the first end surface 12. However, this does not cause a large problem. In FIG. 6, the thin layer of conductive paste 34 that may be left on the first end surface 12 is not shown.

If the above-described affinity-reducing process is not performed, the conductive paste 34 spreads over the first end surface 12 and the side surfaces 14 to 17, as shown by the broken line in FIG. 6. As a result, the thickness of the conductive paste 34 on the ridge portion 24 is reduced.

Thus, a first dipping step for the first-end-surface-12 side of the component body 18 is finished.

Next, preferably, a first drying step for drying the conductive paste 34 applied to the first-end-surface-12 side of the component body 18 is performed. The corner portion 25 of the first outer electrode 22 illustrated in FIG. 1 is made of the conductive paste 34 applied to the first-end-surface-12 side in the first dipping step.

Figure 7A:
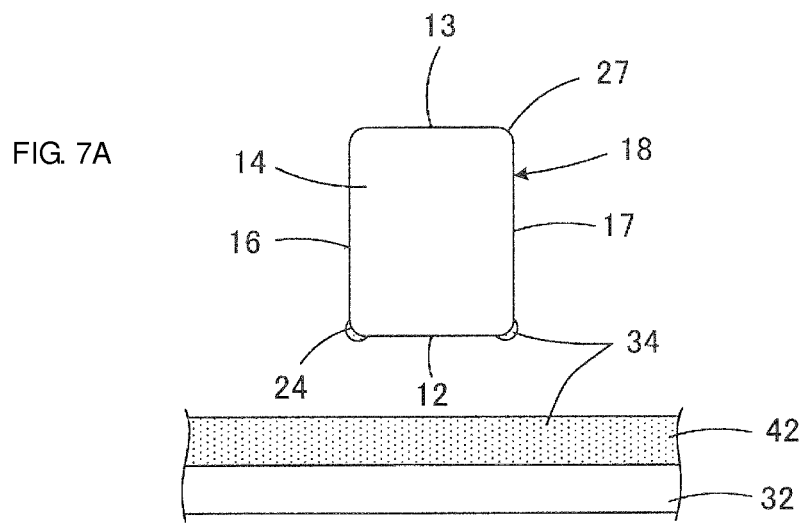
FIGS. 7A to 7C are sectional views illustrating the way in which a second dipping step is performed by the conductive-paste-applying device illustrated in FIG. 3.

Next, a second dipping step for the first-end-surface-12 side of the component body 18 is performed. First, the blade 37 is operated so as to form a conductive paste layer 42 made of the conductive paste 34 on the stage 32, as illustrated in FIG. 7A. The conductive paste layer 42 is formed so as to have a relatively large thickness, such as about 200 μm to about 300 μm, for example.

Figure 7B:
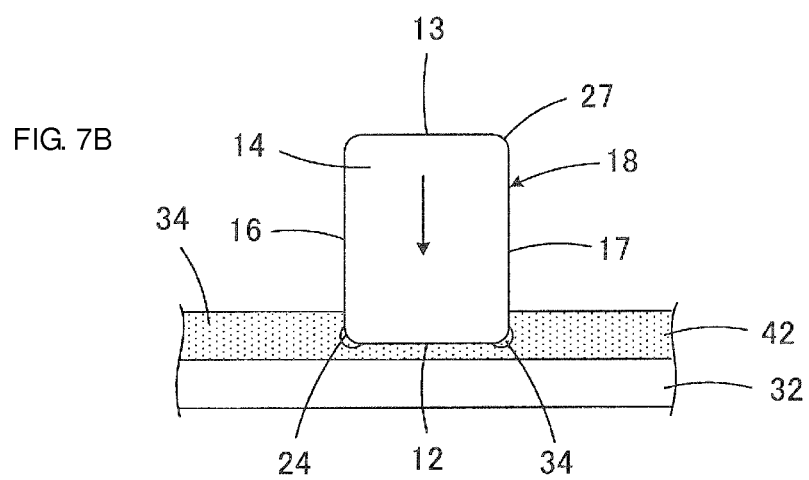

Next, as illustrated in FIG. 7B, the component body holder 38 is moved so that the component body 18 is moved downward in the direction shown by the arrow, and the first end surface 12 of the component body 18 is dipped into the conductive paste layer 42. At this time, the component body 18 is dipped so as to be covered with the conductive paste layer 42 over a region that extends beyond the edge of the conductive paste 34 applied in the above-described first drying step and that covers portions of the side surfaces 14 to 17 of the component body 18. To make the thickness of the conductive paste 34 on the first end surface of the component body 18 greater than or equal to a predetermined thickness, the distance between the first end surface 12 of the component body 18 and the stage 32 is maintained at a predetermined distance or more.

Figure 7C:
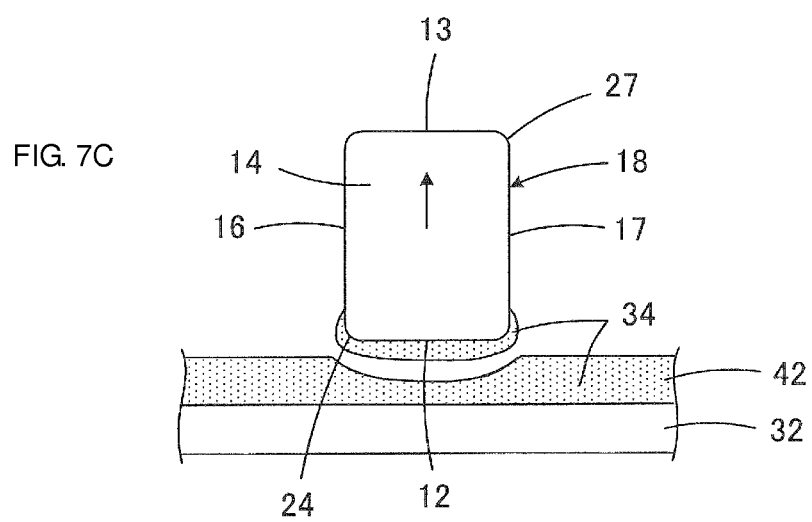

Next, as illustrated in FIG. 7C, the component body holder 38 is moved so that the component body 18 is moved upward in the direction shown by the arrow and pulled away from the conductive paste layer 42. At this time, a predetermined amount of conductive paste 34 is applied to the first end surface 12 of the component body 18.

An excess portion of the conductive paste 34 applied to the first end surface 12 of the component body 18 may also be removed as necessary.

Next, preferably, a second drying step for drying the conductive paste 34 applied to the first-end-surface-12 side of the component body 18 in the second dipping step is performed. The main portion 26 of the first outer electrode 22 illustrated in FIG. 1 is made of the conductive paste 34 applied to the first-end-surface-12 side in the second dipping step.

Figure 8:
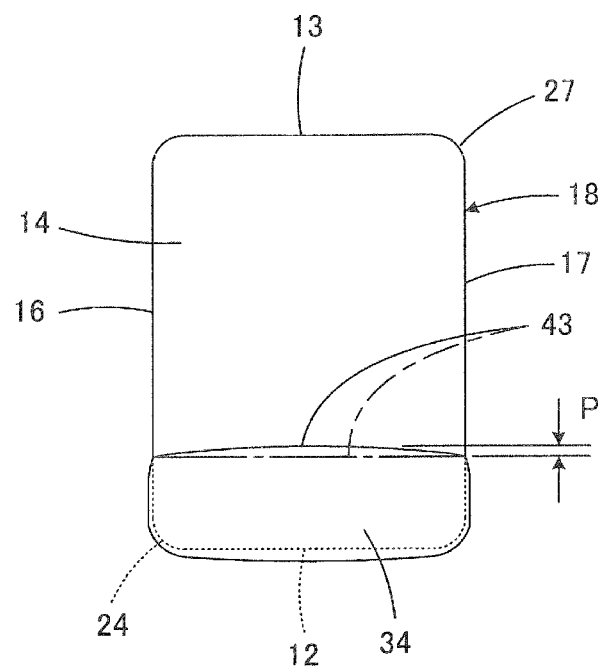
FIG. 8 is a front view of the component body illustrating the manner in which the conductive paste is applied after the step illustrated in FIG. 7C.

FIG. 8 is a front view illustrating the manner in which the conductive paste 34 is applied after the step illustrated in FIG. 7C. As described above, since at least the side surfaces 14 to 17 of the component body 18 are subjected to the affinity-reducing process, the conductive paste 34 used to form the outer electrode 22 does not easily spread upward along the side surfaces 14 to 17. Therefore, the amount P by which an edge 43 of the conductive paste 34 bulges is reduced. In FIG. 8, the dot-dash chain line shows the edge 43 in the case where the conductive paste 34 does not spread upward along the side surfaces 14 to 17.

To confirm this, an experiment was carried out using component bodies 18 whose dimensions in the length direction, the width direction, and the thickness direction were about 1.0 mm, about 0.5 mm, and about 0.5 mm, respectively. Examples in which the affinity-reducing process was performed were compared with comparative examples in which the affinity-reducing process was not performed. As a result, the average of the amounts of bulge P in ten comparative examples was about 59 μm, and that in ten examples was smaller than that, and was about 31 μm.

Next, the orientation in which each component body 18 is held by the component body holder 38 of the conductive-paste-applying device 31 illustrated in FIG. 3 is reversed, and the second-end-surface-13 side of the component body 18 is subjected to the first dipping step. The first dipping step for the second-end-surface-13 side of the component body 18 is similar to the above-described first dipping step for the first-end-surface-side of the component body 18 except that the first end surface 12 is replaced by the second end surface 13, and redundant description is thus omitted.

Next, preferably, the first drying step is performed to dry the conductive paste 34 applied to the second-end-surface-13 side of the component body 18 in the first dipping step.

Next, the second-end-surface-13 side of the component body 18 is subjected to the second dipping step. The second dipping step for the second-end-surface-13 side of the component body 18 is also similar to the above-described second dipping step for the first-end-surface-12 side of the component body 18, and redundant description is thus omitted.

Next, preferably, the second drying step is performed to dry the conductive paste 34 applied to the second-end-surface-13 side of the component body 18 in the second dipping step.

Thus, the conductive-paste-applying step is completed.

Next, the conductive paste 34 applied to the first and second end surfaces 12 and 13 of the component body 18 as described above is subjected to a heat treatment to form the first and second outer electrodes 22 and 23. When the conductive paste 34 contains a glass component, the heat treatment preferably is performed at a temperature of about 800° C., for example. When the conductive paste 34 contains a thermosetting resin, the heat treatment is performed at a temperature at which the thermosetting resin cures.

Then, the outer electrodes 22 and 23 are plated as necessary so that, for example, a Ni plating film and a Sn plating film (not shown) are formed, in that order, on the first and second outer electrodes 22 and 23.

Thus, the monolithic ceramic capacitor 11 illustrated in FIG. 1 is completed.

To confirm the thicknesses of the outer electrodes 22 and 23 on the chamfered ridge portions 24 and 27 of the monolithic ceramic capacitor 11, the following experiment was carried out. That is, monolithic ceramic capacitors 11 including component bodies 18 whose dimensions in the length direction, the width direction, and the thickness direction were about 1.0 mm, about 0.5 mm, and about 0.5 mm, respectively, were ground, and the thicknesses of thinnest portions of the outer electrodes 22 and 23 on the ridge portions 24 and 27 in the ground cross section were measured. The thicknesses in examples in which the affinity-reducing process was performed were compared with those in comparative examples in which the affinity-reducing process was not performed. As a result, the average of the thicknesses in ten comparative examples was about 9 μm, and that in ten examples was about 11 μm. In addition, the minimum value of the thicknesses in the ten comparative examples was about 6 µm, and that in the ten examples was 8 µm. This result shows that the thicknesses of the outer electrodes 22 and 23 on the ridge portions 24 and 27 according to the examples are greater than those according to the comparative examples.

Although a method for manufacturing an electronic component according to a preferred embodiment of the present invention has been described preferably by using the monolithic ceramic capacitor 11 illustrated in the figures, various modifications are possible within the scope of the present invention.

For example, in the above-described preferred embodiment, first, the first-end-surface-12 side of the component body 18 preferably is subjected to the first dipping step, the first drying step, the second dipping step, and the second drying step, and then the second-end-surface-13 side preferably is subjected to the first dipping step, the first drying step, the second dipping step, and the second drying step. In this case, there is an advantage that it is only necessary to change the orientation in which the component body 18 is held by the component body holder 38 only once.

However, when such an advantage is not required, after the first-end-surface-12 side of the component body 18 is subjected to the first dipping step and the first drying step, the second-end-surface-13 side may be subjected to the first dipping step and the first drying step. Subsequently, one of the first-end-surface-12 side and the second-end-surface-13 side is subjected to the second dipping step and the second drying step, and then the other of the first-end-surface-12 side and the second-end-surface-13 side is subjected to the second dipping step and the second drying step.

In addition, in the above-described preferred embodiment, the heat treatment step preferably is performed after the first dipping step, the first drying step, the second dipping step, and the second drying step for both the first-end-surface-12 side and the second-end-surface-13 side of the component body are all finished. However, the number of times the heat treatment step is performed can be increased. For example, the heat treatment step may be additionally performed between the first drying step and the second dipping step. In addition, the heat treatment step may be additionally performed between the conductive-paste-applying step for the first-end-surface-12 side and the conductive-paste-applying step for the second-end-surface-13 side.

When, for example, the heat treatment step is performed before the conductive-paste-applying step is completed as described above, the effect of the affinity-reducing process may be eliminated or reduced by the heat treatment. In such a case, the affinity-reducing step may be performed again between the heat treatment step and the subsequent dipping step. The affinity-reducing process may be performed before each dipping step irrespective of the elimination or reduction in the effect of the affinity-reducing process due to the heat treatment.

Assuming the case in which a second affinity-reducing step for performing the affinity-reducing process again is performed after the first dipping step and before the second dipping step as described above, the manner in which fluorine contained in, for example, fluorocarbon used as the material having a low affinity for the solvent remains will now be discussed.

Figure 9:
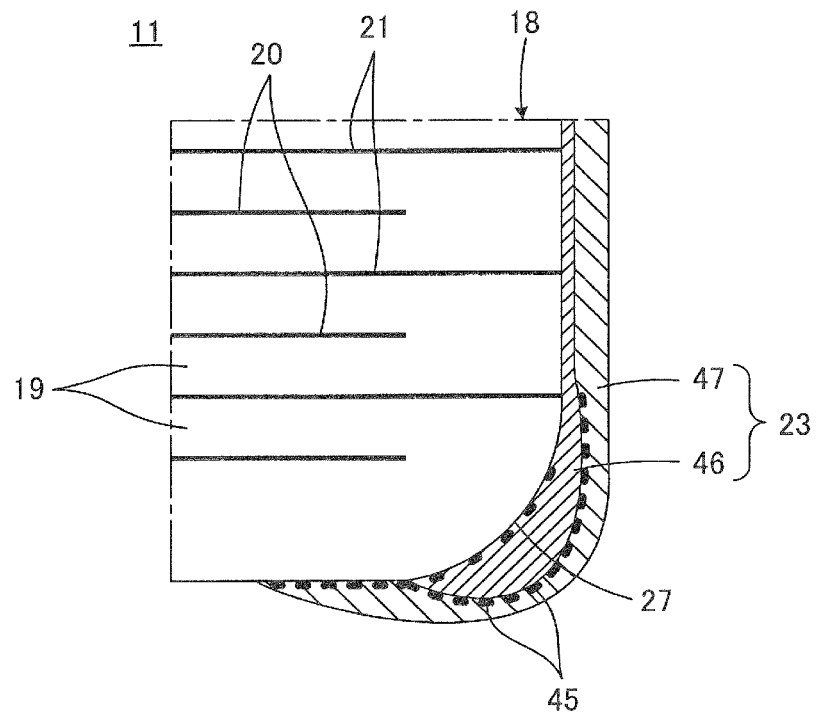
FIG. 9 is an enlarged sectional view of a ridge portion of the component body of the monolithic ceramic capacitor illustrated in FIG. 1, and illustrates the manner in which fluorine contained in a material having a low affinity for solvent remains.

The fluorocarbon generally remains in the obtained monolithic ceramic capacitor 11. FIG. 9 schematically illustrates the manner in which fluorocarbon 45 remains at the second-outer-electrode-23 side. The manner in which fluorocarbon remains at the first-outer-electrode-22 side is similar to the manner in which the fluorocarbon 45 remains at the second-outer-electrode-23 side as illustrated in FIG. 9. Therefore, only the manner in which the fluorocarbon 45 remains at the second-outer-electrode-23 side will be described with reference to FIG. 9.

Although a major portion of the fluorocarbon contained in the material having a low affinity for the solvent evaporates in the heat treatment step, some amount of fluorocarbon remains. As illustrated in FIG. 9, the fluorocarbon 45 may remain in a spot pattern along an interface between the component body 18 and a first layer portion 46 of the outer electrode 23, the first layer portion 46 being made of the conductive paste 34 applied in the first dipping step (see FIGS. 4A to 4C), and an interface between the first layer portion 46 made of the conductive paste 34 applied in the first dipping step and a second layer portion 47 of the outer electrode 23, the second layer portion 47 being made of the conductive paste 34 applied in the second dipping step (see FIGS. 7A to 7C). In the case where the drying step is performed and the heat treatment step is additionally performed as necessary after the first dipping step and before the second dipping step, a larger amount of fluorocarbon is expected to remain along the interface between the first layer portion 46 and the second layer portion 47 than along the interface between the component body 18 and the first layer portion 46.

Therefore, if the monolithic ceramic capacitor 11 is analyzed and it is determined that the fluorocarbon 45 exists at least in intermediate regions in the thickness direction of portions of the outer electrodes 22 and 23 located on the ridge portions 24 and 27, respectively, it can be confirmed that the monolithic ceramic capacitor 11 was manufactured by a manufacturing method according to one of the various preferred embodiments of the present invention. The fluorocarbon 45 contributes to increasing the moisture resistance of the monolithic ceramic capacitor 11.

In the above-described preferred embodiment, some of the inner electrodes 20 and 21 extend to the chamfered ridge portions 24 and 27 of the component body 18. However, the inner electrodes 20 and 21 may be arranged such that none of them extends to the chamfered ridge portions 24 and 27 of the component body 18.

Another preferred embodiment of the present invention will now be described with reference to FIGS. 10A to 12. FIGS. 10A to 10C, 11A to 11C, and 12 correspond to FIGS. 4A to 4C, 7A to 7C, and 8, respectively. In FIGS. 10A to 12, components corresponding to those illustrated in FIGS. 4A to 4C, 7A to 7C, and 8 are denoted by the same reference numerals, and redundant descriptions thereof are thus omitted.

Figure 10A:
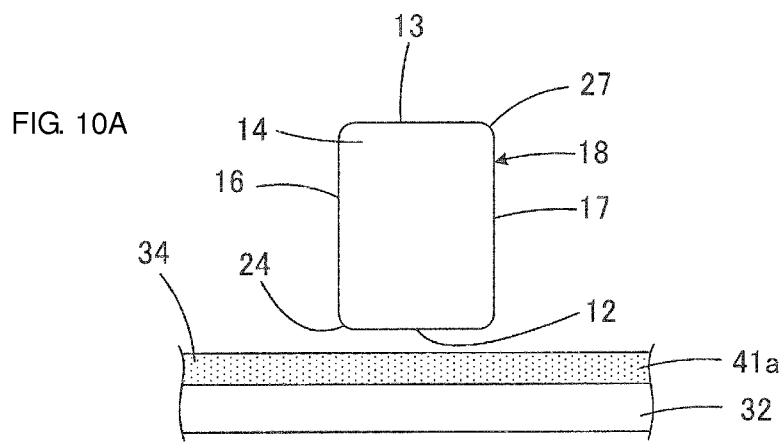
FIGS. 10A to 10C are sectional views illustrating the way in which a first dipping step is performed by the conductive-paste-applying device illustrated in FIG. 3 according to a second preferred embodiment of the present invention.

First, as illustrated in FIG. 10A, a conductive paste layer 41a made of the conductive paste 34 is formed on the stage 32. The conductive paste layer 41a is formed so as to have a relatively small thickness.

Figure 10B:
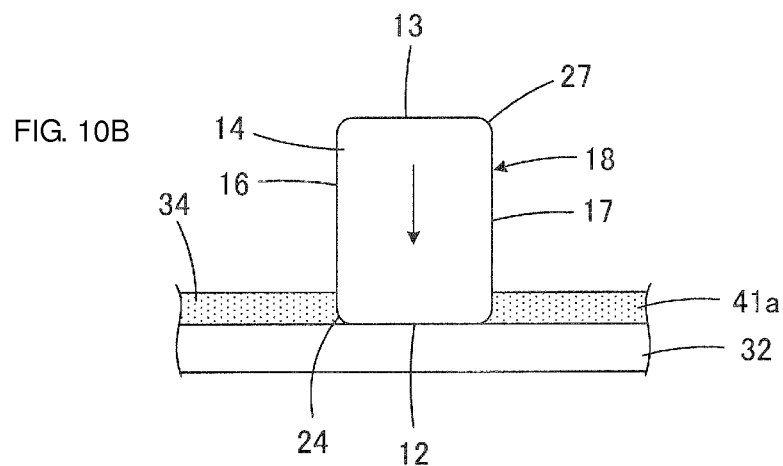

Next, as illustrated in FIG. 10B, the component body holder 38 (not illustrated in FIG. 10B, see FIG. 3) is moved so that the component body 18 is moved downward in the direction shown by the arrow, and the first end surface 12 of the component body 18 is dipped into the conductive paste layer 41a. At this time, at least the ridge portions 24 of the component body 18 are covered by the conductive paste layer 41a.

Figure 10C:
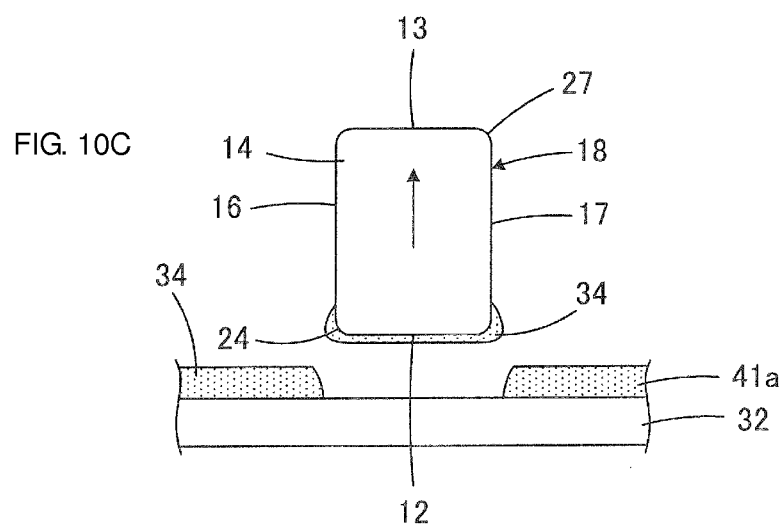

Next, as illustrated in FIG. 10C, the component body 18 is moved upward in the direction shown by the arrow and pulled away from the conductive paste layer 41a. At this time, a predetermined amount of conductive paste 34 is applied to the first end surface 12 of the component body 18.

Next, a step similar to the above-described step illustrated in FIGS. 5A to 5C is performed so that an excess portion of the conductive paste 34 applied to the first end surface 12 of the component body 18 is removed. The step of removing the excess portion may be omitted if it is not necessary.

Thus, the first dipping step for the first-end-surface-12 side of the component body 18 is finished.

Next, preferably, a first drying step for drying the conductive paste 34 applied to the first-end-surface-12 side of the component body 18 is performed.

Then, a second affinity-reducing step for performing the affinity-reducing process again on portions of the conductive paste 34 applied in the first dipping step, the portions being located on the side surfaces 14 to 17 of the component body 18, is performed after the first dipping step and before the second dipping step.

Figure 11A:
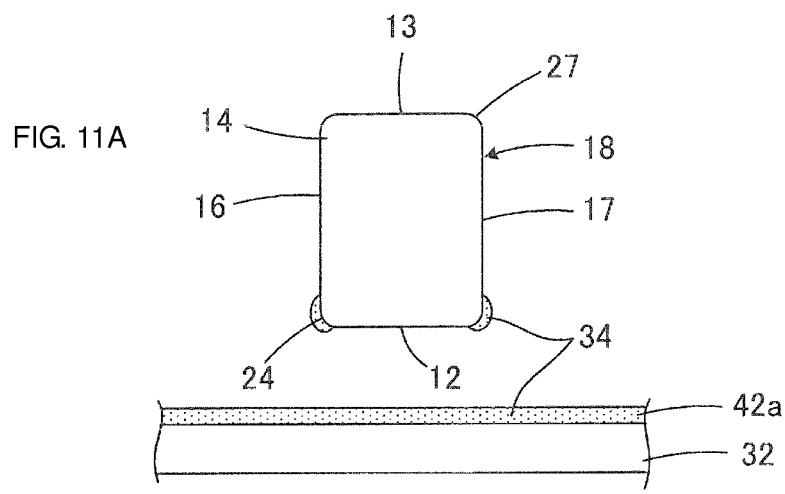
FIGS. 11A to 11C are sectional views illustrating the way in which a second dipping step is performed by the conductive-paste-applying device illustrated in FIG. 3 after the first dipping step illustrated in FIGS. 10A to 10C.

Next, a second dipping step for the first-end-surface-side of the component body 18 is performed. First, a conductive paste layer 42*a* made of the conductive paste 34 is formed on the stage 32, as illustrated in FIG. 11A. The conductive paste layer 42*a* is formed so as to have a relatively large thickness.

Figure 11B:
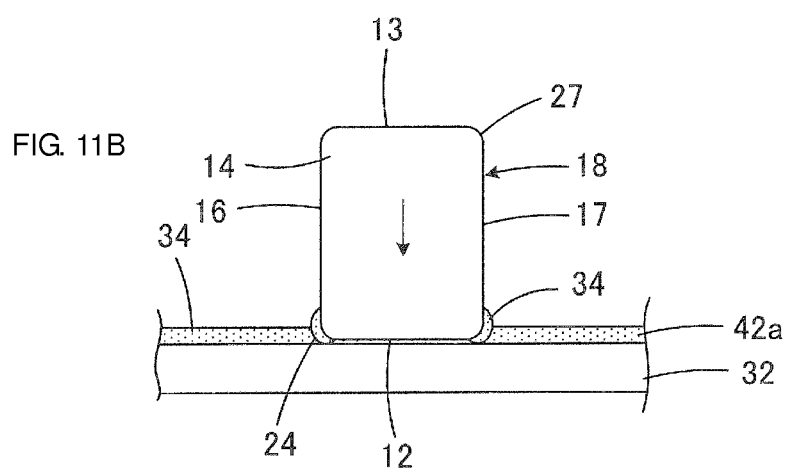

Next, as illustrated in FIG. 11B, the component body 18 is moved downward in the direction shown by the arrow, and the first end surface 12 of the component body 18 is dipped into the conductive paste layer 42*a*. At this time, the component body 18 is dipped such that the conductive paste layer 42*a* does not reach the edge of the conductive paste 34 applied in the above-described first drying step. To make the thickness of the conductive paste 34 on the first end surface 12 of the component body 18 greater than or equal to a predetermined thickness, the distance between the first end surface 12 of the component body 18 and the stage 32 is maintained at a predetermined distance or more.

Figure 11C:
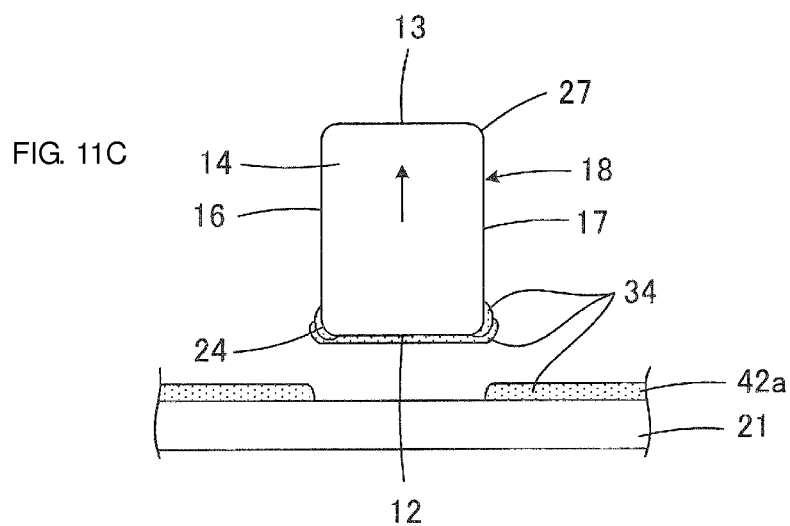

Next, as illustrated in FIG. 11C, the component body 18 is moved upward in the direction shown by the arrow and pulled away from the conductive paste layer 42*a*. At this time, a predetermined amount of conductive paste 34 is applied to the first end surface 12 of the component body 18.

An excess portion of the conductive paste 34 applied to the first end surface 12 of the component body 18 may be removed as necessary. Alternatively, the excess portion may be left as it is.

Next, preferably, a second drying step for drying the conductive paste 34 applied to the first-end-surface-12 side of the component body 18 in the second dipping step is performed.

Figure 12:
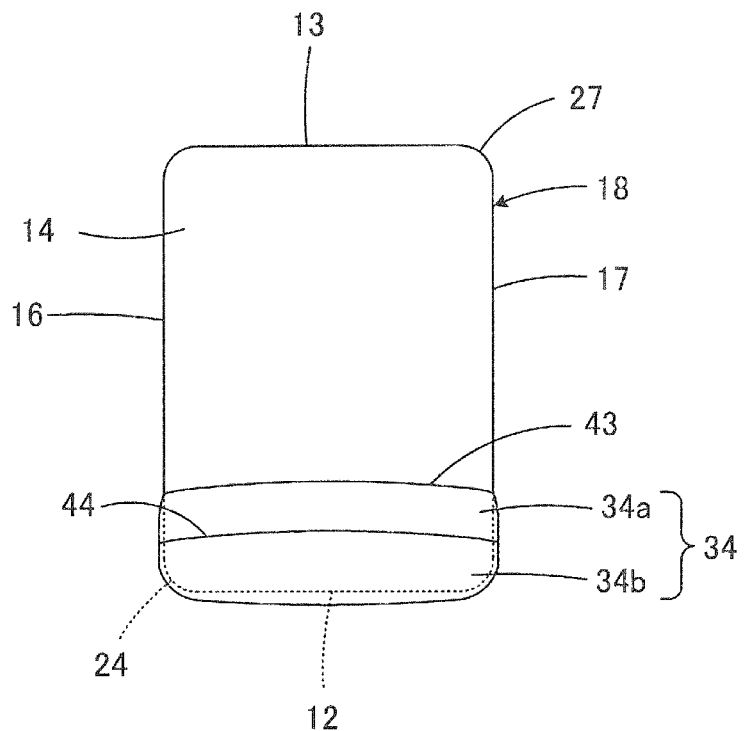
FIG. 12 is a front view of the component body illustrating the manner in which the conductive paste is applied after the step illustrated in FIG. 11C.
Figure 13:
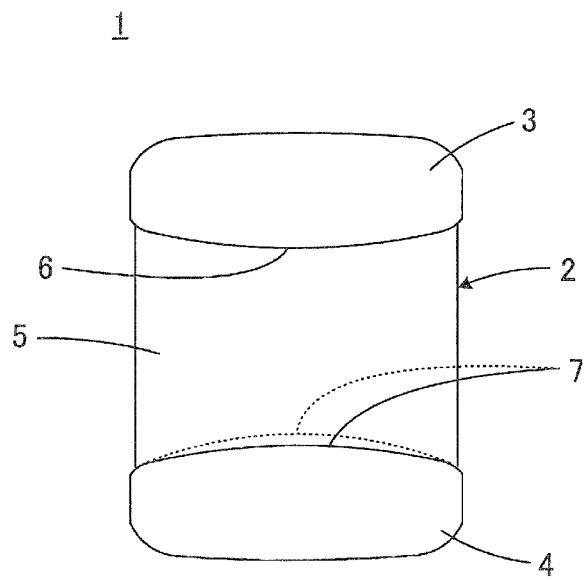
FIG. 13 is a front view of a conventional electronic component for describing a problem in the related art that is solved by preferred embodiments of the present invention.

FIG. 12 is a front view illustrating the manner in which the conductive paste 34 is applied after the step illustrated in FIG. 11C. In FIG. 12, the conductive paste 34 applied in the first dipping step is denoted by 34*a*, and the conductive paste 34 applied in the second dipping step is denoted by 34*b*. As illustrated in FIG. 12, the conductive paste 34*b* applied in the second dipping step includes an edge 44 located on portions of the conductive paste 34*a* applied in the first dipping step, the portions being located on the side surfaces 14 to 17 of the component body 18.

In the present preferred embodiment, since at least the side surfaces 14 to 17 of the component body 18 preferably are subjected to the affinity-reducing process, the conductive paste 34*a* applied in the first dipping step does not easily spread upward along the side surfaces 14 to 17. Therefore, the amount by which an edge 43 of the conductive paste 34*a* bulges is significantly reduced.

In addition, portions of the conductive paste 34*a* applied in the first dipping step, the portions being located on the side surfaces 14 to 17 of the component body 18, are also subjected to the affinity-reducing process. Therefore, the conductive paste 34*b* applied in the second dipping step also does not easily spread upward along the conductive paste 34*a*, and the amount by which the edge 44 of the conductive paste 34*b* applied in the second dipping step bulges is also reduced. This also leads to prevention of tombstoning, because the difference between the manners in which solder adheres to the outer electrodes 23 and 24 is significantly reduced when the monolithic ceramic capacitor 11 is mounted.

Next, the orientation in which the component body 18 is held by the component body holder 38 (not illustrated, see FIG. 3) is reversed, and the second-end-surface-13 side of the component body 18 is subjected to the first dipping step, the first drying step, the second dipping step, and the second drying step by a method similar to the above-described method.

Other steps of the second preferred embodiment described above with reference to FIGS. 10A to 12 are similar to those of the first preferred embodiment, and explanations thereof are thus omitted.

Preferred embodiments of the present invention and modifications and variations thereof are also applicable to monolithic ceramic electronic components other than monolithic ceramic capacitors, electronic components that are not monolithic, and electronic components other than ceramic electronic components.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for manufacturing an electronic component, the method comprising:
   a step of preparing a component body including first and second end surfaces that oppose each other and a side surface that connects the first and second end surfaces;
   a step of preparing conductive paste containing metal powder, a resin, and a solvent;
   a step of applying the conductive paste at least to each of the first and second end surfaces of the component body; and
   a step of performing a heat treatment on the conductive paste to form first and second outer electrodes at least on the first and second end surfaces, respectively, of the component body; wherein
   the step of applying the conductive paste includes:
      a first affinity-reducing step of performing an affinity-reducing process at least on the side surface of the component body to reduce an affinity for the solvent;
      a first dipping step of dipping each of the first and second end surfaces of the component body into the conductive paste, the first dipping step being performed after the first affinity-reducing step; and
      a second dipping step of dipping each of the first and second end surfaces of the component body into the conductive paste, the second dipping step being performed after the first dipping step.

2. The method according to claim 1, wherein the conductive paste applied in the first dipping step is located at least on ridge portions at which the first and second end surfaces and the side surface of the component body intersect, and has a maximum thickness at portions located on the ridge portions.

3. The method according to claim 1, wherein the component body includes a plurality of ceramic layers that are stacked and a plurality of inner electrodes that extend along a plurality of interfaces between the ceramic layers and that are to be electrically connected to the outer electrodes.

4. The method according to claim 3, wherein the step of preparing the component body includes a step of chamfering ridge portions of the component body, and at least one of the inner electrodes extends to the ridge portions of the component body.

5. The method according to claim 1, wherein the second dipping step is performed so that the conductive paste is applied over a region that extends beyond an edge of the conductive paste applied in the first dipping step and that covers a portion of the side surface of the component body.

6. The method according to claim 5, wherein the step of applying the conductive paste further includes a second affinity-reducing step of performing the affinity-reducing process at least on the side surface of the component body again after the first dipping step and before the second dipping step.

7. The method according to claim 1, wherein, in the second dipping step, the conductive paste is applied so that an edge of the conductive paste is located on a portion of the conductive paste that is applied in the first dipping step and located on the side surface of the component body.

8. The method according to claim 7, wherein the step of applying the conductive paste further includes a second affinity-reducing step of performing the affinity-reducing process again on the portion of the conductive paste applied in the first dipping step and located on the side surface of the component body, after the first dipping step and before the second dipping step.

9. The method according to claim 1, wherein the step of applying the conductive paste further includes a step of removing excess portions of the conductive paste applied to the first and second end surfaces of the component body after the first dipping step.

10. The method according to claim 9, wherein the step of performing the heat treatment on the conductive paste includes a first heat treatment step that is performed between the first drying step and the second dipping step and a second heat treatment step that is performed after the second drying step.

11. The method according to claim 10, wherein each of the first and second affinity-reducing steps includes a step of applying a material having a low affinity for the solvent to at least the side surface of the component body by plasma processing.

12. The method according to claim 1, wherein the step of applying the conductive paste further includes a first drying step of drying the conductive paste applied in the first dipping step after the first dipping step, and a second drying step of drying the conductive paste applied in the second dipping step after the second dipping step.

13. The method according to claim 1, wherein the electronic component is a monolithic ceramic capacitor.

14. The method according to claim 1, wherein the conductive paste includes a glass component or a thermosetting resin.

15. The method according to claim 1, wherein the first affinity-reducing step of performing the affinity-reducing process includes injecting a gas having a low affinity for the solvent into a vacuum chamber and simultaneously applying a high-frequency voltage to the gas.

16. The method according to claim 1, wherein the first affinity-reducing step of performing the affinity-reducing process includes performing plasma processing.

17. The method according to claim 1, wherein the first affinity-reducing step of performing the affinity-reducing process includes dipping the component body into liquid containing fluorine.

18. The method according to claim 1, wherein first, the first end surface of the component body is subjected to the first dipping step, the first drying step, the second dipping step, and the second drying step, and then the second end surface is subjected to the first dipping step, the first drying step, the second dipping step, and the second drying step.

19. The method according to claim 1, wherein first, the first end surface of the component body is subjected to the first dipping step and the first drying step, and then the second end surface is subjected to the first dipping step and the first drying step, and subsequently one of the first end surface and the second end surface is subjected to the second dipping step and the second drying step, and then the other one of the first end surface and the second end surface is subjected to the second dipping step and the second drying step.

20. An electronic component comprising:
a component body including first and second end surfaces that oppose each other and a side surface that connects the first and second end surfaces; and
first and second outer electrodes located at least on the first and second end surfaces, respectively, of the component body; wherein
the first and second outer electrodes include portions located on ridge portions at which the first and second end surfaces and the side surface of the component body intersect; and
fluorocarbon exists at least in intermediate regions in a thickness direction of the portions of the first and second outer electrodes located on the ridge portions.

* * * * *